US011561971B2

(12) United States Patent
Kharlamov

(10) Patent No.: US 11,561,971 B2
(45) Date of Patent: Jan. 24, 2023

(54) METHOD AND SYSTEM FOR KEYWORD SEARCH OVER A KNOWLEDGE GRAPH

(71) Applicant: Robert Bosch GmbH, Stuttgart (DE)

(72) Inventor: Evgeny Kharlamov, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/228,297

(22) Filed: Apr. 12, 2021

(65) Prior Publication Data

US 2021/0326337 A1 Oct. 21, 2021

(30) Foreign Application Priority Data

Apr. 16, 2020 (EP) .................................. 20169775

(51) Int. Cl.
*G06F 16/245* (2019.01)
*G06F 16/901* (2019.01)

(52) U.S. Cl.
CPC ........ *G06F 16/245* (2019.01); *G06F 16/9024* (2019.01)

(58) Field of Classification Search
None
See application file for complete search history.

(56) References Cited

U.S. PATENT DOCUMENTS

| 8,620,909 | B1 * | 12/2013 | Rennison | ............ | G06F 16/3335 707/723 |
| 2008/0243811 | A1 * | 10/2008 | He | ........................ | G06F 16/334 |
| 2013/0339352 | A1 * | 12/2013 | Jin | ........................ | G06Q 10/047 707/736 |
| 2015/0227589 | A1 * | 8/2015 | Chakrabarti | ...... | G06F 16/24573 707/748 |
| 2015/0310073 | A1 * | 10/2015 | Chakrabarti | ........ | G06F 16/2465 707/722 |
| 2018/0189389 | A1 * | 7/2018 | Baldini Soares | ... | G06F 16/9024 |

(Continued)

OTHER PUBLICATIONS

"Null." FOLDOC: Free Online Dictionary of Computing. Published Jun. 17, 2003. Accessed Jan. 24, 2022 from http://foldoc.org/null (Year: 2003).*

(Continued)

*Primary Examiner* — Tony Mahmoudi
*Assistant Examiner* — Umar Mian
(74) *Attorney, Agent, or Firm* — Norton Rose Fulbright US LLP; Gerard Messina

(57) ABSTRACT

A computer implemented method for keyword search over a knowledge graph. The knowledge graph comprises a large number of vertices representing entities and a large number of edges representing relations between the entities. The knowledge graph is enhanced with static labels. A static label for each vertex includes a list of distances between the vertex and other vertices of the knowledge graph. The method includes receiving a set of keywords, constructing dynamic labels based on the set of keywords and determining a subgraph of the knowledge graph for the set of keywords based on the static labels and based on the dynamic labels. The constructing of the dynamic labels includes obtaining keyword vertices by mapping keywords of the set of keywords to vertices of the knowledge graph and obtaining for the keyword vertices distances between the keyword vertices and predecessors of the keyword vertices from the static labels.

10 Claims, 3 Drawing Sheets

(56) References Cited

U.S. PATENT DOCUMENTS

2020/0074999 A1* 3/2020 Elliott ............... G06F 16/313
2020/0125727 A1* 4/2020 Wu .................. G06F 40/279

OTHER PUBLICATIONS

Gou, Gang. Efficient algorithms for querying large-scale data in relational, XML, and graph-structured data repositories. North Carolina State University, 2008. (Year: 2008).*
Frishman, Yaniv, and Ayellet Tal. "Online dynamic graph drawing." IEEE Transactions on Visualization and Computer Graphics 14.4 (2008): 727-740. (Year: 2008).*
Beres, Yolanta, and Chris I. Dalton. "Dynamic label binding at run-time." Proceedings of the 2003 Workshop on New security paradigms. 2003. pp. 39-46. (Year: 2003).*
Stefan Voß, "Steiner's Problem in Graphs: Heuristic Methods," Discrete Applied Mathematics, vol. 40, 1992, pp. 45-72. <https://www.sciencedirect.com/science/article/pii/0166218X92900212> Downloaded Apr. 12, 2021.
Ulrik Brandes, "A Faster Algorithm for Betweenness Centrality", Journal of Mathematical Sociology, vol. 25, No. 2, 2001, pp. 1-15. <http://www.uvm.edu/pdodds/research/papers/others/2001/brandes2001a.pdf> Downloaded Apr. 12, 2021.
Ziyad Alghamdi, et al., "A Benchmark for Betweenness Centrality Approximation Algorithms on Large Graphs," SSDBM, 2017, pp. 1-12. Downloaded Apr. 12, 2021.
Ye Li, et al. "An Experimental Study on Hub Labeling Based Shortest Path Algorithms," Proceedings of the VLDB Endowment, vol. 11, No. 4, 2017, pp. 445-457.
Hao He, et al., "Blinks: Ranked Keyword Searches on Graphs," SIGMOD'07, 2007, pp. 1-12.

\* cited by examiner

METHOD AND SYSTEM FOR KEYWORD SEARCH OVER A KNOWLEDGE GRAPH

CROSS REFERENCE

The present application claims the benefit under 35 U.S.C. § 119 of European Patent Application No. EP 20169775.2 filed on Apr. 16, 2020, which is expressly incorporated herein by reference in its entirety.

FIELD

The present invention relates to a computer implemented method and a system for keyword search over a knowledge graph.

BACKGROUND INFORMATION

Keyword search allows users to query data without a prior knowledge of specialized query languages. A keyword query is a set of words posed by the user that should be matched to the data. Relevant data fragments are then extracted and presented to the user in an appropriate format as answers. The exact way of matching keywords, extracting data, and composing answers depends on the format of the underlying data and the semantics of query answering.

Knowledge graphs are mainly used for graph-based knowledge representation by describing (real world) entities and their relations. A knowledge graph comprises a large number of vertices representing the entities and a large number of edges representing the relations between the entities.

A common type of semantics for keyword queries over graph data is to match each keyword to a vertex of the graph and to extract trees of minimum weight that contain these vertices, known as minimum-weight Steiner trees as described in Stefan Voß. 1992. "Steiner's Problem in Graphs: Heuristic Methods." Discr. Appl. Math. 40, 1 (1992), 45-72.

In an edge-weighted data graph and a keyword query, one firstly finds for each keyword the matching set of vertices in the graph, i.e., all the vertices where the keyword can be matched, and then finds a tree in the graph that spans the matching sets, i.e., contains at least one vertex from each matching set, and that minimizes the total edge weight. This optimization problem is the group Steiner tree (GST) problem as described in Stefan Voß. 1992. "Steiner's Problem in Graphs: Heuristic Methods." Discr. Appl. Math. 40, 1 (1992), 45-72. Keywords are also allowed to be matched to edges. Edge matches can be straightforwardly transformed into vertex matches via graph subdivision, and be processed as vertex matches.

Computing answers to keyword queries under the GST semantics is computationally demanding. Moreover, existing approximation algorithms that have provable quality guarantees also have prohibitively high run time for large graphs. Knowledge graphs have become increasingly popular in recent years, and they can be huge. One goal of the present invention is to provide efficient keyword search systems and methods over knowledge graphs.

SUMMARY

This may be achieved by devices and methods according to example embodiments of the present invention.

An embodiment of the present invention includes a computer implemented method for keyword search over a knowledge graph, wherein the knowledge graph comprises a large number of vertices representing entities and a large number of edges representing relations between said entities, and the knowledge graph is enhanced with static labels, wherein a static label for each vertex comprises a list of distances between said particular vertex and other vertices of the knowledge graph, wherein the method comprises the steps of receiving a set of keywords constructing dynamic labels based on the set of keywords and determining a subgraph of the knowledge graph for the set of keywords based on the static labels and based on the dynamic labels, wherein the step of constructing dynamic labels comprises a step of obtaining keyword vertices by mapping keywords of the set of keywords to vertices of the knowledge graph and a step of obtaining for the keyword vertices distances between the keyword vertices and predecessors of the keyword vertices from the static labels.

In the context of the present invention, static labels are referred to as an offline constructed index structure.

Preferably, a static label of each vertex comprises a list of distances between said particular vertex and other vertices of the knowledge graph, wherein the distances are sorted in descending order with regard to betweenness centrality of the vertices, starting with a distance to a vertex with the highest number of edges pointing in and out of said vertex.

The betweenness centrality be of a vertex v is defined as $$bc(v) = \sum_{s,t \in V \setminus \{v\}} \frac{\sigma_{st}(v)}{\sigma_{st}},$$

where $\sigma_{st}$ is the number of shortest paths between vertices s and t, and $\sigma_{st}(v)$ is the number of the paths $\sigma_{st}$ that pass through the vertex v. The betweenness centrality can be computed using the Brandes algorithm as described in Ulrik Brandes: 2001, "A faster algorithm for betweenness centrality," J. Math. Soc. 25, 2 (2001), 163-177. However, for large graphs the Brandes algorithm can cause high run times. Therefore, the use of a source sampling based approximation algorithm and starting with a vertex with the highest number of edges pointing in and out of said vertex has proved to be advantageous. Further details of this algorithm are described in Ziyad AlGhamdi, Fuad Jamour, Spiros Skiadopoulos, and Panos Kalnis, 2017: "A Benchmark for Betweenness Centrality Approximation Algorithms on Large Graphs," https://doi.org/10.1145/3085504.3085510.

Preferably, the distance between a pair of vertices is the sum of weights of the edges connecting the pair of vertices. Weights are non-negative real numbers mapped to edges using a weighting function. For example, small weights indicate great importance and high weights indicate a low importance. The distance between a pair of vertices can be computed by summing up the weights of the edges connecting the pair of vertices.

Preferably, the static label of each vertex comprises further information on the predecessors of the vertex. Each adjacent vertex of the vertex gives a predecessor of a vertex. Storing the predecessors does not increase the asymptotic space complexity of the static labels.

Dynamic labels are constructed online, which means during the runtime of the keyword search. The dynamic labels are constructed based on the set of keywords by mapping keywords of the set of keywords to vertices of the knowledge graph. Each keyword comprises at least one keyword vertex. For the keyword vertices, distances between the keyword vertices and their predecessors are obtained from the static labels. Preferably, dynamic labels are only constructed for vertices to which a keyword is mapped.

The subgraph of the knowledge graph provides an answer to the keyword search.

According to an example embodiment of the present invention, the dynamic labels are, in particular temporarily, stored in the form of a matrix, wherein elements of the matrix indicate the distances between the keyword vertices and vertices of the knowledge graph. Preferably, rows correspond to the keywords of the set of keywords and columns correspond to vertices of the knowledge graph.

According to an example embodiment of the present invention, elements of the matrix indicate the distance between a keyword vertex and a vertex of the knowledge graph, if the vertex of the knowledge graph is a predecessor of the keyword vertex. Preferably, the elements of a specific row indicate the distance between a keyword vertex and a vertex of the knowledge graph for a specific keyword of the set of keywords.

According to an example embodiment of the present invention, an element is "null" if vertex of the knowledge graph is not a predecessor of the keyword vertex.

According to an example embodiment of the present invention, if a keyword comprises more than one keyword vertex, the distance for the keyword vertex with the minimal distance to its predecessor is obtained. Preferably, the element of the matrix contains only distance between keyword vertices and their predecessors, which are minimal for the keyword.

According to an example embodiment of the present invention, the set of keywords comprises a number g of keywords and the dynamic labels are constructed for every keyword vertex $K_i$ with $2 \leq i \leq g$, such that the matrix is of the size $(g-1) \times n$, wherein n is the number of vertices of the knowledge graph.

According to an example embodiment of the present invention, the method comprises further computing for each keyword vertex in a first keyword the smallest distance between the keyword vertices of the first keyword and the keyword vertices of the other keywords of the set of keywords based on static labels and dynamic labels.

According to an example embodiment of the present invention, the step determining a subgraph for the set of keywords comprises a step of determining the shortest path between each pair of keyword vertices based on static labels and dynamic labels of the keyword vertices, such that the subgraph of the knowledge graph is minimal with regard to distances between said keyword vertices.

According to another embodiment of the present invention, the method can be advantageously extended to support edge matches by mapping keywords of the set of keywords to edges of the knowledge graph.

According to an example embodiment of the present invention, edges are transformed into vertices using graph sub division. The subdivision of an edge yields a new vertex and replaces the edge by two new edges. In this way, edge matches are transformed into vertex matches. Advantageously, the steps described with regard to mapping keywords to vertices can be performed with regard to edges.

The present invention further includes a computer program for keyword search over a knowledge graph, wherein the computer program comprises computer readable instructions that when executed by a computer cause the computer to execute a method for keyword search over a knowledge graph according to the embodiments.

Advantageously, in accordance with an example embodiment of the present invention, the computer program comprises instructions that when executed by a computer cause the computer to execute any of the steps of receiving a set of keywords constructing dynamic labels based on the set of keywords and determining a subgraph of the knowledge graph for the set of keywords based on the static labels and based on the dynamic labels, wherein the step of constructing dynamic labels comprises a step of obtaining keyword vertices by mapping keywords of the set of keywords to vertices of the knowledge graph and a step of obtaining for the vertices, to which a keyword is mapped, distances between the vertices and predecessors of the vertices from the static labels.

Advantageously, in accordance with an example embodiment of the present invention, the computer program comprises instructions that when executed by a computer cause the computer to compute for each keyword vertex in keyword $K_1$ the smallest distance between the keyword vertices of keyword $K_1$ and the keyword vertices of the keywords $K_1$ to $K_g$ based on static labels and dynamic labels.

Advantageously, in accordance with an example embodiment of the present invention, the computer program comprises instructions that when executed by a computer cause the computer to determine a subgraph for the set of keywords comprises a step of determining the shortest path between each pair of keyword vertices based on static labels and dynamic labels of the keyword vertices, such that the subgraph of the knowledge graph is minimal with regard to distances between said keyword vertices.

Advantageously, in accordance with an example embodiment of the present invention, the computer program comprises instructions that allows extending the method to support edge matches.

The present invention further includes a system for keyword search over a knowledge graph, wherein the system is configured to execute a method for keyword search over a knowledge graph according to the embodiments.

According to an example embodiment of the present invention, the system for keyword search over a knowledge graph comprises at least one memory unit for storing a set of keywords and/or least one memory unit for storing a computer program for keyword search over a knowledge graph, wherein said computer program controls the execution of the method for keyword search over a knowledge graph according to the embodiments.

Advantageously, in accordance with an example embodiment of the present invention, the system comprises a storing unit for storing a knowledge graph and/or a storing unit for storing a computer program for keyword search over a knowledge graph according to the embodiments.

Further advantageous embodiments of the present invention are derived from the following description and the figures.

DETAILED DESCRIPTION OF EXAMPLE EMBODIMENTS

Figure 1:
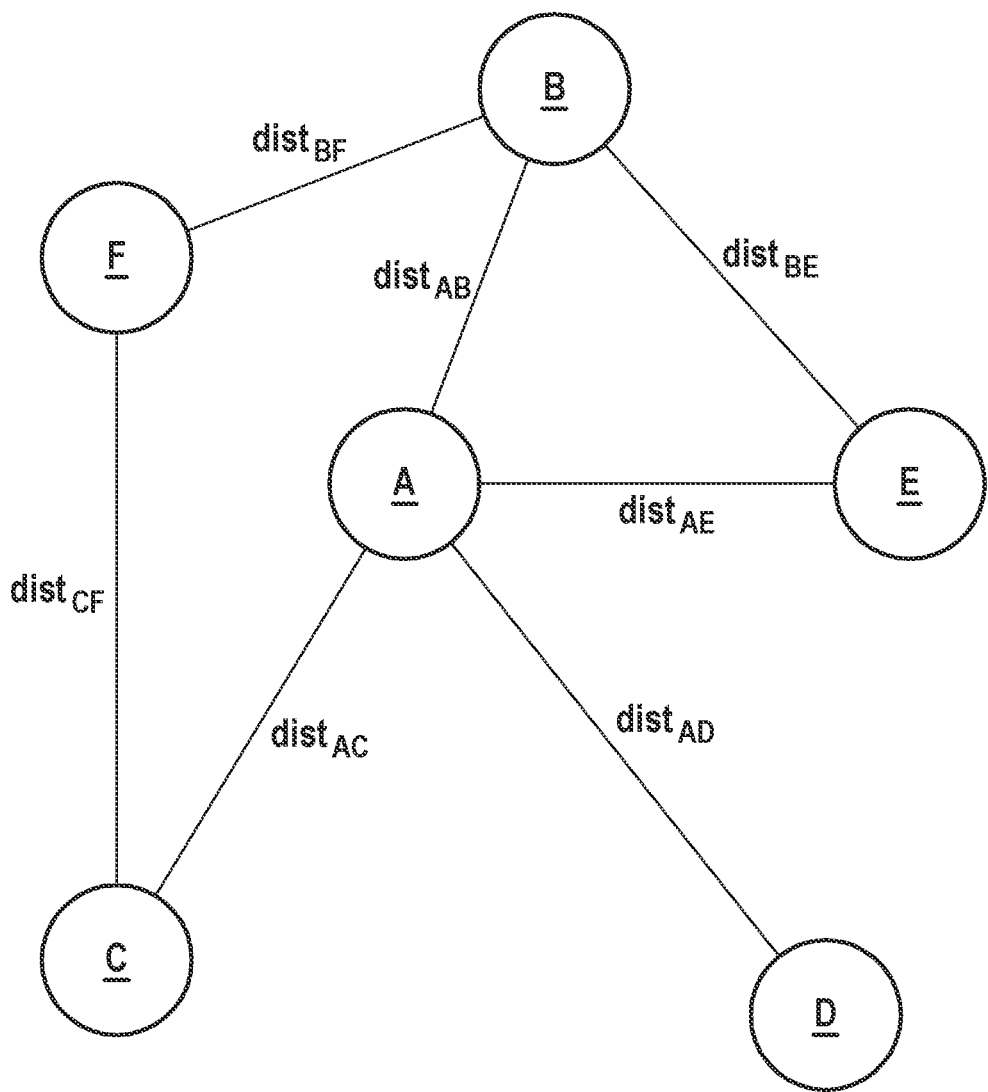
FIG. 1 depicts a schematic view of a knowledge graph, in accordance with an example embodiment of the present invention.

FIG. 1 depicts an exemplary presentation of a knowledge graph KG. The knowledge graph KG can be used for graph-based knowledge representation by describing (real world) entities and their relations. The knowledge graph KG comprises a large number of vertices V representing the entities and a large number of edges E representing the relations between said entities.

Figure 2:
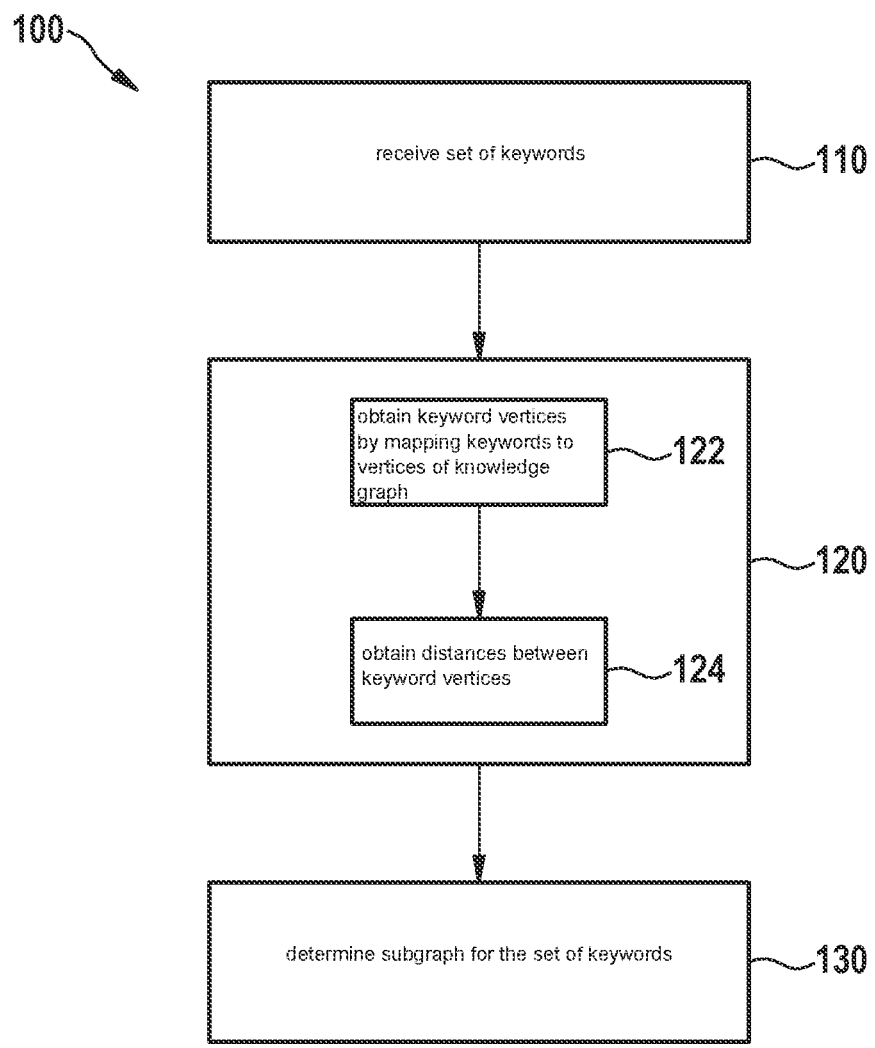
FIG. 2 depicts a schematic view of depicts a schematic view of a flow diagram of a computer implemented method for keyword search over a knowledge graph according to an example embodiment of the present invention.

As shown in FIG. 2, the knowledge graph KG comprises vertices A, B, C, D, E and F. The distance between the vertices are for example $dist_{AB}$=0.6, $dist_{AC}$=0.4, $dist_{AD}$=1, $dist_{AE}$=0.3, $dist_{BE}$=0.8, $dist_{BF}$=0.1 and $dist_{CF}$=2.

The knowledge graph KG is enhanced with static labels LS. In the context of the disclosure static labels LS are referred to as an offline constructed index structure.

Computing of static labels LS is described referring to the following table, which gives an exemplary presentation of static labels LS:

| L(A) | A (dist = 0, pred = A) |
|---|---|
| L(B) | A (dist = 0.6, pred = A), B (dist = 0, pred = B) |
| L(C) | A (dist = 0.4, pred = A), C (dist = 0, pred = C) |
| L(D) | A (dist = 1, pred = A), D (dist = 0, pred = D) |
| L(E) | A (dist = 0.3, pred = A), B (dist = 0.8, pred = B), E (dist = 0, pred = E) |
| L(F) | A (dist = 0.7, pred = B), B (dist = 0.1, pred = B), F (dist = 0, pred = F) |

The distances are sorted in descending order with regard to betweenness centrality of the vertices, starting with a distance to a vertex with the highest number of edges pointing in and out of said vertex.

The betweenness centrality be of a vertex v is defined as $$bc(v) = \sum_{s,t \in V \setminus \{v\}} \frac{\sigma_{st}(v)}{\sigma_{st}},$$

where $\sigma_{st}$ is the number of shortest paths between vertices s and t, and $\sigma_{st}(v)$ is the number of the paths $\sigma_{st}$ that pass through the vertex v. According to the disclosure, the betweenness centrality is using a source sampling based approximation algorithm and starting with a vertex with the highest number of edges pointing in and out of said vertex. Further details of this algorithm are described in Ziyad AlGhamdi, Fuad Jamour, Spiros Skiadopoulos, and Panos Kalnis, 2017: "A Benchmark for Betweenness Centrality Approximation Algorithms on Large Graphs," https://doi.org/10.1145/3085504.3085510.

According to an example embodiment of the present invention, the distance between a pair of vertices is the sum of weights of the edges E connecting the pair of vertices V. Weights are non-negative real numbers mapped to edges E using a weighting function. For example, small weights indicate great importance and high weights indicate a low importance.

The distance between a pair of vertices V can be computed by summing up the weights of the edges E connecting the pair of vertices V. Preferably, a distance is computed by computing the smallest distance between a pair of vertices V.

According to the example embodiment, the static label LS of each vertex V comprises further information on the predecessors of the vertex V. Each adjacent vertex V of a specific vertex V gives a predecessor of a vertex V.

A computer-implemented method 100 for keyword search over a knowledge graph KG is described referring to FIG. 2. The knowledge graph KG is enhanced with static labels LS as described above.

The method 100 comprises
a step 110 of receiving a set of keywords $k_1, k_2, \ldots, k_g$,
a step 120 of constructing dynamic labels M based on the set of keywords $k_1, k_2, \ldots, k_g$, wherein the step 120 of constructing dynamic labels M comprises a step of obtaining 122 keyword vertices $K_1, K_2, \ldots, K_9$ by mapping keywords $k_1, k_2, \ldots, k_g$ of the set to vertices V of the knowledge graph KG and a step of obtaining 124 for the keyword vertices $K_1, K_2, \ldots, K_g$ distances between the keyword vertices $K_1, K_2, \ldots, K_9$ and predecessors of the keyword vertices $K_1, K_2, \ldots, K_g$ from the static labels LS, and
a step 130 of determining a subgraph of the knowledge graph KG for the set of keywords $k_1, k_2, \ldots, k_g$ based on the static labels LS and based on the dynamic labels M.

The subgraph of the knowledge graph KG provides an answer to the keyword search.

Dynamic labels M are constructed online, which means during the runtime of the keyword search. The dynamic labels M are constructed based on the set of keywords $k_1, k_2, \ldots, k_g$ by mapping keywords $k_1, k_2, \ldots, k_g$ of the set of keywords $k_1, k_2, \ldots, k_g$ to vertices V of the knowledge graph KG. Each keyword $k_1, k_2, \ldots, k_g$ comprises at least one keyword vertex $K_1, K_2, \ldots, K_g$. For the keyword vertices $K_1, K_2, \ldots, K_g$ distances between the keyword vertices $K_1, K_2, \ldots, K_g$ and their predecessors are obtained from the static labels LS. Preferably, dynamic labels M are only constructed for vertices V to which a keyword $k_1, k_2, \ldots, k_g$ is mapped to.

According to an example embodiment of the present invention, the dynamic M labels are, in particular temporarily, stored in the form of a matrix M, wherein elements of the matrix M indicate the distances between the keyword vertices $K_1, K_2, \ldots, K_9$ and vertices V of the knowledge graph KG. Preferably, rows correspond to the keywords vertices $K_1, K_2, \ldots, K_g$ and columns correspond to vertices V of the knowledge graph KG.

According to an example embodiment of the present invention, the set of keywords $k_1, k_2, \ldots, k_g$ comprises a number g of keywords $k_1, k_2, \ldots, k_g$ and the dynamic labels M are constructed for every keyword vertex $K_i$ with $2 \leq i \leq g$, such that the matrix M is of the size (g−1)×n, wherein n is the number of vertices V of the knowledge graph KG.

According to an example embodiment of the present invention, elements of the matrix M indicate the distance between a keyword vertex $K_1, K_2, \ldots, K_9$ and a vertex V of the knowledge graph KG, if the vertex V of the knowledge graph KG is a predecessor of the keyword vertex $K_1, K_2, \ldots, K_9$. Preferably, the elements of a specific row indicate the distance between a keyword vertex $K_1, K_2, \ldots, K_g$ v and a vertex V of the knowledge graph KG for a specific keyword $k_1, k_2, \ldots, k_g$ of the set K of keywords $k_1, k_2, \ldots, k_g$.

According to an example embodiment of the present invention, an element is "null" if vertex V of the knowledge graph KG is not a predecessor of the keyword vertex $K_1, K_2, \ldots, K_9$.

According to an example embodiment of the present invention, if a keyword $k_1, k_2, \ldots, k_g$ comprises more than one keyword vertex $K_1, K_2, \ldots, K_g$, the distance for the keyword vertex $K_1, K_2, \ldots, K_9$ with the minimal distance to its predecessor is obtained. Preferably, the element of the matrix M contains only distance between keyword vertices $K_1, K_2, \ldots, K_g$ and their predecessors which are minimal for the keyword $k_1, k_2, \ldots, k_g$.

The following matrix table is an exemplary embodiment for dynamic labels M for keyword vertices $K_2$ and $K_3$, which provides the elements for the matrix M.

Keyword vertex $K_2$ is for example mapped to vertex E of knowledge graph KG and keyword vertex $K_3$ is for example mapped to vertices C and D of knowledge graph KG.

From the static labels LS in particular from the label L(E) of vertex E the following information can be obtained: The predecessors of vertex E are vertices A and B, wherein the distance between vertices E and A is 0.3 and the distance between vertices E and B is 0.8. The vertices E, D and F are not predecessors of E. Therefore, the respective entries in the table are "null".

As keyword vertex $K_3$ is mapped to vertices C and D from the static labels L(C) and L(D) of vertices C and D the following information can be obtained: Vertex A is a predecessor of C and D. The distance between vertices A and C is 0.4 and the distance between vertices A and D is 1. According to the embodiment, if a keyword $k_1, k_2, \ldots, k_g$ comprises more than one keyword vertex $K_1, K_2, \ldots, K_g$, the distance for the keyword vertex $K_1, K_2, \ldots, K_9$ with the minimal distance to its predecessor is obtained. Therefore, the distance between vertex A and vertex C is obtained, such that the element of the matrix contains only distances between keyword vertices $K_3$ and their predecessors, which are minimal for the keyword $k_3$.

|       | A         | B         | C         | D         | E       | F    |
|-------|-----------|-----------|-----------|-----------|---------|------|
| $K_2$ | $E_{(0.3)}$ | $E_{(0.8)}$ | null      | null      | $E_{(0)}$ | null |
| $K_3$ | $C_{(0.4)}$ | null      | $C_{(0)}$ | $D_{(0)}$ | null    | null |

According to an example embodiment of the present invention, the method comprises further computing for each keyword vertex $K_1$ in keyword $k_1$ the smallest distance between the keyword vertices $K_1$ of keyword $k_1$ and the keyword vertices $K_2$ to $K_9$ of the keywords $k_2$ to $k_g$ based on static labels LS and dynamic labels M.

For every predecessor of a keyword vertex $K_1$ of $k_1$ the distance between the keyword vertex $K_1$ and its predecessors is obtained from the static label LS. Further, for the predecessor the smallest distance to the keyword vertices $K_2, \ldots, K_g$ of the other keywords $k_2, \ldots, k_g$ is obtained from the dynamic labels M, in particular from the matrix M.

The smallest distance between a keyword vertex $K_1$ of keyword $k_1$ and the keyword vertices $K_2, \ldots, K_g$ is summed up to obtain a shortest path between the keyword vertices v of the keywords $K_1, K_2, \ldots, K_9$.

The step of computing the shortest path is further used when determining the subgraph of the knowledge graph KG for the set of keywords $k_1, k_2, \ldots, k_g$.

According to an example embodiment of the present invention, the step determining a subgraph of the knowledge graph KG for the set of keywords $k_1, k_2, \ldots, k_g$ comprises a step of determining the shortest path between each pair of keyword vertices $K_1, K_2, \ldots, K_g$ based on static labels and dynamic labels of the keyword vertices $K_1, K_2, \ldots, K_g$, such that the subgraph of the knowledge graph KG is minimal with regard to distances between said keyword vertices $K_1, K_2, \ldots, K_g$.

According to another example embodiment of the present invention, the method can be advantageously extended to support edge matches by mapping keywords $k_1, k_2, \ldots, k_g$ of the set of keywords $k_1, k_2, \ldots, k_g$ to edges E of the knowledge graph KG.

According to an example embodiment of the present invention, edges E are transformed into vertices V using graph sub division. The subdivision of an edge E yields a new vertex V and replaces the edge E by two new edges E. In this way, edge matches are transformed into vertex matches. Advantageously, the steps described with regard to mapping keywords $k_1, k_2, \ldots, k_g$ to vertices V can be performed with regard to edges E.

Figure 3:
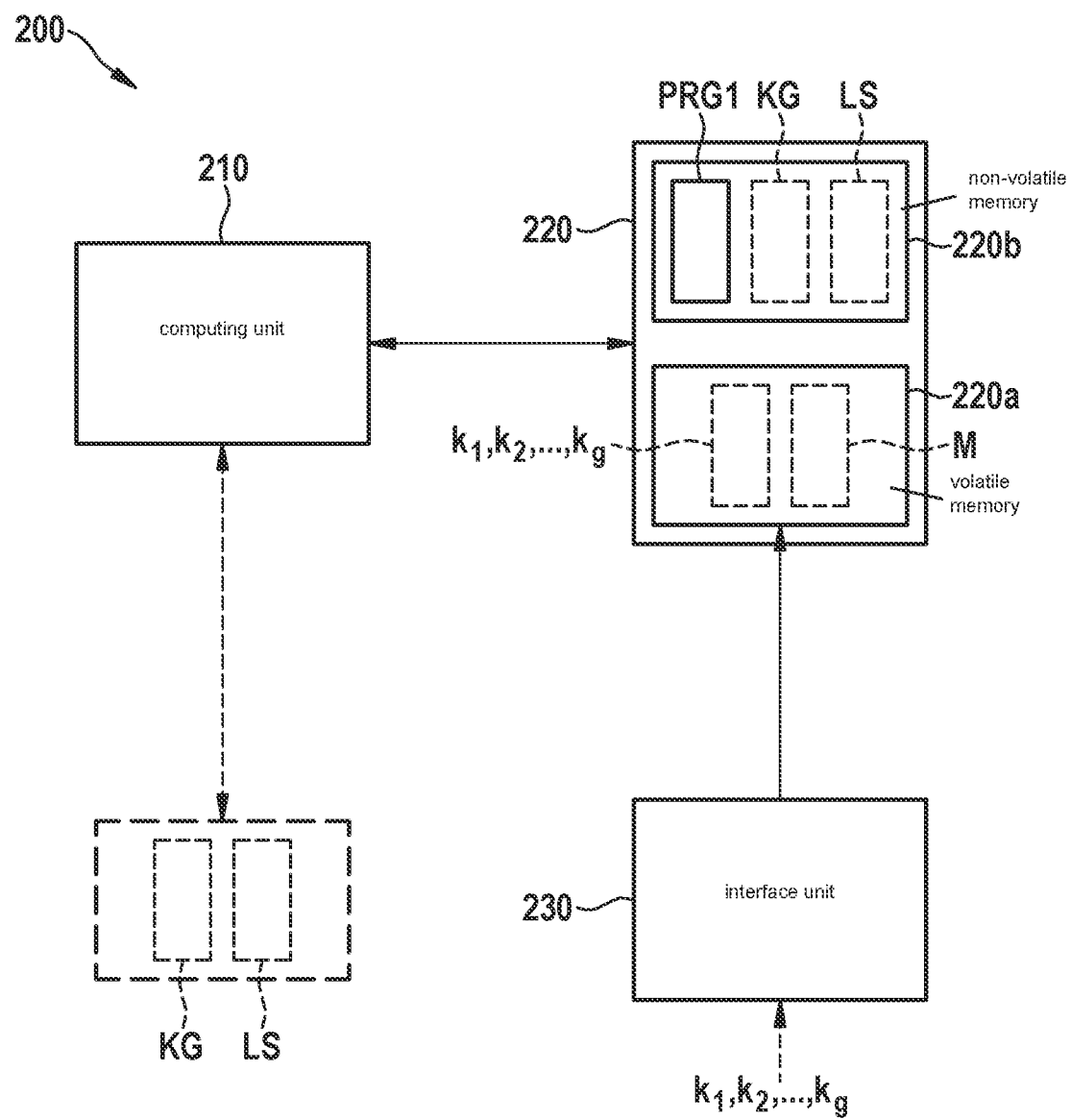
FIG. 3 depicts a schematic view of a block diagram of a system for keyword search over a knowledge graph according to an example embodiment of the present invention.

FIG. 3 depicts a schematic view of a system 200 for keyword search over the knowledge graph KG according to an embodiment.

The system 200 is configured to carry out at least the steps 110, 120 and 130 of the method 100.

The system 200 comprises a computing unit 210, e.g. a microprocessor and/or microcontroller and/or programmable logic device, in particular FPGA, and/or application-specific integrated circuit, ASIC, and/or digital signal processor, DSP, and/or a combination thereof.

The system 200 comprises at least one storing unit 220. The storing unit 220 may further comprise a volatile memory 220a, in particular random access memory (RAM), and/or a non-volatile memory 220b, e.g. a flash EEPROM. The non-volatile memory 220b contains at least one computer program PRG1 for the computing unit 210, which controls the execution of the method 100 for keyword search over the knowledge graph KG according to the embodiments and/or any other operation of the system 200.

The system 200 may further comprise an interface unit 230 for receiving data constituting the set of keywords $k_1, k_2, \ldots, k_g$. The set of keywords $k_1, k_2, \ldots, k_g$ can be stored in said volatile memory 220a of said storing unit 220. Further, the dynamic labels M can be stored in the volatile memory 220a of the storing unit 220.

The system 200 may further comprise a storing unit for storing the knowledge graph KG and/or the static labels LS of the knowledge graph KG. According to another embodiment the system 200 is configured to access a storing unit comprising the knowledge graph KG and/or static labels LS of the knowledge graph KG, for example an external storing unit. The external storing unit is exemplarily depicted by the dotted lines in FIG. 3.

The computer program PRG1 for keyword search over the knowledge graph KG, comprises computer readable instructions that when executed by a computer, preferable the computing unit 210 of the system 200, cause the computer to execute the method 100 for keyword search over a knowledge graph KG according to the above described embodiments.

Advantageously, the computer program PRG1 comprises instructions that when executed by a computer cause the computer to execute any of the steps of receiving 110 a set of keywords $k_1, k_2, \ldots, k_g$, constructing 120 dynamic labels based on the set of keywords $k_1, k_2, \ldots, k_g$, wherein the step 120 of constructing dynamic labels comprises a step of obtaining 122 keyword vertices $K_1, K_2, \ldots, K_g$ by mapping keywords $k_1, k_2, \ldots, k_g$ of the set of keywords $k_1, k_2, \ldots, k_g$ to vertices V of the knowledge graph KG and a step of obtaining 124 for the keyword vertices $K_1, K_2, \ldots, K_g$ distances between the keyword vertices $K_1, K_2, \ldots, K_g$ and predecessors of the keyword vertices $K_1, K_2, \ldots, K_g$ from the static labels LS, and determining 130 a subgraph of the knowledge graph KG for the set of keywords $k_1, k_2, \ldots, k_g$ based on the static labels LS and based on the dynamic labels.

Advantageously, the computer program PRG1 comprises instructions that when executed by the computer 210 cause the computer 210 to store the dynamic labels in the form of a matrix M, wherein elements of the matrix indicate the distances between the keyword vertices $K_1, K_2, \ldots, K_g$ and vertices V of the knowledge graph KG. Preferably, rows correspond to the keywords vertices $K_1, K_2, \ldots, K_g$ of the set of keywords $k_1, k_2, \ldots, k_g$ and columns correspond to vertices V of the knowledge graph KG. According to an embodiment the set of keywords $k_1, k_2, \ldots, k_g$ comprises a number g of keywords $k_1, k_2, \ldots, k_g$ and the dynamic labels are constructed for every keyword vertex $K_i$ with $2 \leq i \leq g$ of keywords $k_2, \ldots, k_g$, such that the matrix M is of the size $(g-1) \times n$, wherein n is the number of vertices of the knowledge graph. According to an embodiment elements of the matrix M indicate the distance between a keyword vertex $K_2, \ldots, K_g$ and a vertex V of the knowledge graph KG, if the vertex V of the knowledge graph KG is a predecessor of the keyword vertex $K_2, \ldots, K_g$. Preferably, the elements of a specific row indicate the distance between a keyword vertex $K_2, \ldots, K_9$ and a vertex V of the knowledge graph KG for a specific keyword $k_2, \ldots, k_g$ of the set of keywords $k_2, \ldots, k_g$. According to an embodiment, an element is "null" if vertex V of the knowledge graph KG is not a predecessor of the keyword vertices $K_2, \ldots, K_g$.

Advantageously, the computer program PRG1 comprises instructions that when executed by the computer 210 if a keyword $k_1, k_2, \ldots, k_g$ comprises more than one keyword vertex $K_1, K_2, \ldots, K_g$, cause the computer 210 to obtain the distance for the keyword vertex $K_1, K_2, \ldots, K_9$ with the minimal distance to its predecessor. Preferably, the element of the matrix M contains only distance between keyword vertices $K_1, K_2, \ldots, K_9$ and their predecessors which are minimal for the keywords $k_1, k_2, \ldots, k_g$.

Advantageously, the computer program PRG1 comprises instructions that when executed by the computer 210 cause the computer 210 to compute for each keyword vertex $K_1$ in a first keyword $k_1$ the smallest distance between the keyword vertices $K_1$ of keyword $k_1$ and the keyword vertices $K_2$ to $K_g$ of the keywords $k_2$ to $k_g$ based on static labels LS and dynamic labels M. For every predecessor of a keyword vertex $K_1$ of $k_1$ the distance between the keyword vertex $K_1$ and its predecessors is obtained from the static label LS. Further, for the predecessor the smallest distance to the keyword vertices $K_2, \ldots, K_g$ of the keywords $k_2, \ldots, k_g$ is obtained from the dynamic labels, in particular from the matrix M. The smallest distance between a keyword vertex $K_1$ of the first keyword $k_1$ and the keyword vertices $K_2, \ldots, K_9$ is summed up to obtain a shortest path between the keyword vertices $K_1, K_2, \ldots, K_9$ of the keywords $k_1, k_2, \ldots, k_g$.

Advantageously, the computer program PRG1 comprises instructions that allows extending the method 100 to support edge matches. According to an embodiment, edges E are transformed into vertices V using graph sub division. The subdivision of an edge E yields a new vertex V and replaces the edge E by two new edges E. In this way, edge matches are transformed into vertex matches. Advantageously, the steps described with regard to mapping keywords $k_1, k_2, \ldots, k_g$ to vertices V can be performed with regard to edges E.

What is claimed is:

1. A computer implemented method for keyword searching over a knowledge graph, wherein the knowledge graph includes a number of vertices representing entities and a number of edges representing relations between the entities, and the knowledge graph is enhanced with static labels, wherein a static label for each vertex of the vertices includes a list of distances between the vertex and other vertices of the knowledge graph, the method comprising the following steps:
receiving a set of keywords;
constructing dynamic labels based on the set of keywords; and
determining a subgraph of the knowledge graph for the set of keywords based on the static labels and based on the dynamic labels;
wherein the step of constructing dynamic labels is performed during a runtime of a keyword search and includes:
obtaining keyword vertices by mapping keywords of the set of keywords to the vertices of the knowledge graph, and
obtaining for the keyword vertices distances between the keyword vertices and predecessors of the keyword vertices from the static labels, wherein the dynamic labels are stored in the form of a matrix, wherein elements of the matrix indicate the distances between the keyword vertices and vertices of the knowledge graph, and wherein the set of keywords includes a number g of keywords and the dynamic labels are constructed for every keyword vertex $K_i$ with $2 \leq i \leq g$, such that the matrix is of the size $(g-1) \times n$, wherein n is the number of vertices of the knowledge graph.

2. The computer implemented method according to claim 1, wherein the elements of the matrix indicate a distance between a keyword vertex of the keyword vertices and a vertex of the knowledge graph, when the vertex of the knowledge graph is a predecessor of the keyword vertex.

3. The computer implemented method according to claim 2, wherein an element of the elements is "null" when the vertex of the knowledge graph is not a predecessor of the keyword vertex.

4. The computer implemented method according to claim 1, wherein when a keyword of the set of keywords includes more than one keyword vertex, the distance for the keyword vertex with a minimal distance to its predecessor is obtained.

5. The computer implemented method according to claim 1, wherein the method further comprises:
computing for each keyword vertex in a first keyword, a smallest distance between the keyword vertices of the first keyword and the keyword vertices of the other keywords based on static labels and dynamic labels.

6. The computer implemented method according to claim 1, wherein the step of determining the subgraph for the set of keywords includes:
determining a shortest path between each pair of keyword vertices based on static labels and dynamic labels of the keyword vertices, such that the subgraph of the knowledge graph is minimal with regard to distances between the keyword vertices.

7. The computer implemented method according to claim 1, further comprising:
mapping keywords of the set of keywords to edges of the knowledge graph.

8. The computer implemented method according to claim 1, wherein edges of the knowledge graph are transformed into vertices using graph sub division.

9. A non-transitory computer readable medium which is stored a computer program for keyword searching over a knowledge graph, wherein the knowledge graph includes a number of vertices representing entities and a number of edges representing relations between the entities, and the knowledge graph is enhanced with static labels, wherein a static label for each vertex of the vertices includes a list of distances between the vertex and other vertices of the knowledge graph, the computer program, when executed by a computer, causing the computer to perform the following steps:

receiving a set of keywords;

constructing dynamic labels based on the set of keywords; and determining a subgraph of the knowledge graph for the set of keywords based on the static labels and based on the dynamic labels;

wherein the step of constructing dynamic labels is performed during a runtime of a keyword search and includes:

obtaining keyword vertices by mapping keywords of the set of keywords to the vertices of the knowledge graph, and obtaining for the keyword vertices distances between the keyword vertices and predecessors of the keyword vertices from the static labels, wherein the dynamic labels are stored in the form of a matrix, wherein elements of the matrix indicate the distances between the keyword vertices and vertices of the knowledge graph, and wherein the set of keywords includes a number g of keywords and the dynamic labels are constructed for every keyword vertex $K_i$ with $2 \leq i \leq g$, such that the matrix is of the size $(g-1) \times n$, wherein n is the number of vertices of the knowledge graph.

10. A system for keyword searching over a knowledge graph, wherein the system comprises at least one memory unit for storing a set of keywords and/or least one non-transitory memory unit on which is stored a computer program for the keyword searching over the knowledge graph, wherein the knowledge graph includes a number of vertices representing entities and a number of edges representing relations between the entities, and the knowledge graph is enhanced with static labels, wherein a static label for each vertex of the vertices includes a list of distances between the vertex and other vertices of the knowledge graph, the computer program, when executed by a computer, causing the computer to perform the following steps:

receiving a set of keywords;

constructing dynamic labels based on the set of keywords; and determining a subgraph of the knowledge graph for the set of keywords based on the static labels and based on the dynamic labels;

wherein the step of constructing dynamic labels is performed during a runtime of a keyword search and includes:

obtaining keyword vertices by mapping keywords of the set of keywords to the vertices of the knowledge graph, and obtaining for the keyword vertices distances between the keyword vertices and predecessors of the keyword vertices from the static labels, wherein the dynamic labels are stored in the form of a matrix, wherein elements of the matrix indicate the distances between the keyword vertices and vertices of the knowledge graph, and wherein the set of keywords includes a number g of keywords and the dynamic labels are constructed for every keyword vertex $K_i$ with $2 \leq i \leq g$, such that the matrix is of the size $(g-1) \times n$, wherein n is the number of vertices of the knowledge graph.

\* \* \* \* \*